E. F. CIGLIA AND L. F. PELLETIER
CARBURETER.
APPLICATION FILED MAR. 9, 1918.
Reissued June 10, 1919.
14,658.
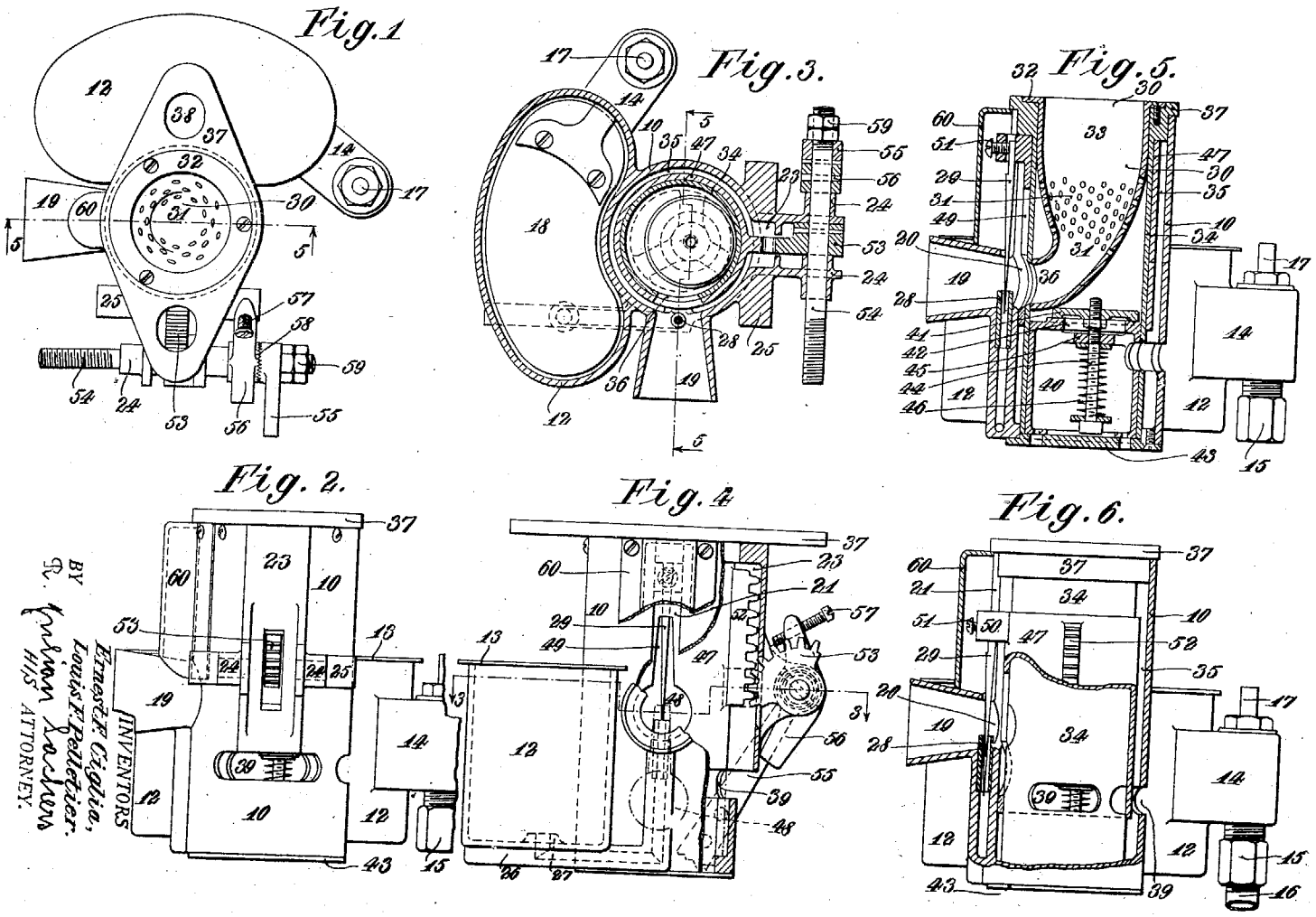
INVENTORS
Ernest F. Ciglia,
Louis F. Pelletier.
BY
R. Julian Lachers
HIS ATTORNEY.

UNITED STATES PATENT OFFICE.

ERNEST F. CIGLIA AND LOUIS F. PELLETIER, OF NEW YORK, N. Y., ASSIGNORS, BY MESNE ASSIGNMENTS, TO E. & E. CARBURETOR COMPANY, INC., A CORPORATION OF NEW YORK.

CARBURETER.

14,658. Specification of Reissued Letters Patent. Reissued June 10, 1919.

Original No. 1,191,156, dated July 18, 1916, Serial No. 784,697, filed August 14, 1913. Application for reissue filed March 9, 1918. Serial No. 221,542.

*To all whom it may concern:*

Be it known that we, ERNEST F. CIGLIA and LOUIS F. PELLETIER, both citizens of the United States, and residents of the city of New York, in the county and State of New York, have invented certain new and useful Improvements in Carbureters, of which the following is a specification.

One of the objects of this invention is to provide an efficient and economical carbureter for hydrocarbon engines in which fuel and air are mixed by delivering a cross flow of fuel to the area of maximum velocity of a flow of air and in which both flows are properly controlled.

In the embodiment of the invention herein specified, this control may be exercised by means located in such area of maximum air velocity, for instance the throat of a Venturi tube, and consists in varying, preferably simultaneously, the active cross section of the fuel nozzle and of the air passage, respectively.

Other forms of construction employing this principle may readily be designed and are intended to be included within the scope, and coming within the spirit of this invention. While it is old in carbureters to place the fuel nozzle at a restriction in an air passage, as shown in an axial parallel arrangement in U. S. Letters Patent No. 693,773, and in a cross flow arrangement in U. S. Letters Patent No. 789,537, it is thought to be broadly new, in either arrangement, to control the fuel nozzle and the air passage restriction, so as to simultaneously and proportionally regulate the fuel and air supply.

In the drawings, showing one form of the invention, Figure 1 is a plan view and Fig. 2, a side elevation. Fig. 3 is a cross sectional view on the line 3—3 of Fig. 4, Fig. 4 is a front elevation, partly in section, Fig. 5, a cross sectional view in line 5—5 of Figs. 1 and 3, and Fig. 6, a side elevation, similar to Fig. 2, and in part a cross sectional view, similar to Fig. 5, illustrating the air supply regulating member.

As illustrated, the shell 10 is a tubular casting, containing a vertical, open-ended, substantially cylindrical bore and a fuel reservoir 12, concentric with, and adjacent to the lower part, and slightly more than half the height of the bore, and cast with an open top, which is closed with a sheet metal cap 13. The reservoir has an extension 14, provided with a union 15, for attaching the fuel pipe 16 and containing a valve 17 connected therewith and operated by the float 18 to control the fuel supply, in the usual manner.

Opening into the bore of the shell 10, preferably at right angles with the reservoir 12, and a suitable distance below its top, is a Venturi inlet 19, from whose throat 20 the shell 10 is formed into a slot 21, for guiding the movement of a reciprocating regulating apparatus. At right angles therewith, diametrically opposite the reservoir 12, is a rack recess 23, whose outer wall is slotted between a pair of bosses 24, behind which are formed outstanding stops 25, the purpose of which will be explained.

Fuel is supplied from the reservoir 12 through a suitable passage 26, drilled in the shell 10, starting from a boss 27 in the reservoir floor and ending at the nozzle 28 which latter extends nearly half way across the Venturi throat into the area of maximum air velocity. Suction is thereby induced, as is the known action of Venturi tubes and the fuel delivery is controlled by a needle 29, operably mounted on the regulating apparatus and reciprocated in the nozzle 28, to enlarge and contract thereby its delivery area.

The air supply members comprise a Venturi tube which is bent substantially through a right angle and is made of two separate parts, viz:—the inlet cone 19 and the delivery part 30 which has a foraminous wall 31 and terminates at its outlet in a positioning flange 32. The throat 20 is at right angles thereto and the passage of the delivery part 30 is horn-like and bends and expands from the throat 20, to merge into a substantially semi-ellipsoidal mixing chamber 33.

The Venturi delivery part 30 is located axially in the bore of the shell 10, by means of a flanged and shouldered open-ended tube 34, somewhat smaller than and extending through the bore of the shell 10, fastened to its wall, surrounded by an annular space 35 and provided with an opening 36 which forms part of the Venturi throat 20. The shouldered upper end terminates in a flange 37, containing bolt-holes 38, by means of which the carbureter is fixed in place on the engine. The throat end of the Venturi delivery part 30, and the flange 32, fit the wall of the tube 34, about its opening 36 and in a recess formed in the flange 37, respectively.

Supplemental registering air inlets 39 are formed in convenient locations, somewhat lower than the Venturi throat 20, in the shell 10, the tube 34 and a box 40 to be described. A supplemental air supply valve 41 is located in the lower part of the tube 34 and is mounted on the cylindrical box 40, whose inner head contains the valve port 42, controlled by the valve 41, and whose outer head 43 is preferably detachable, to facilitate assembling and extends on and is fastened to the end of the shell 10, to secure the box 40 and valve 41 in place. The valve 41 is a puppet valve of usual construction, screwed on a threaded stem 44, locked in adjusted position by lock nuts 45 and seated by a spring 46.

A tubular throttle valve 47 is mounted on the tube 34, adapted to cover and uncover the supplemental air inlets 39 and control the supply of air to the valve 41. It is provided with a keyhole shaped port 48, consisting of a circular opening, corresponding to the Venturi throat 20 and an upwardly directed, converging extension 49. A guide head 50, in line with the port 48, contains a hole, in which the needle 29 is adjustably mounted by a set screw 51. At right angles thereto is a rack 52, for reciprocating the throttle 47 and needle 29, to simultaneously and proportionally control the air and fuel supplies. The apparatus which accomplishes such control comprises the throttle 47 and rack 52, a pinion segment 53, in mesh therewith and fixed to a shaft 54, mounted in the bosses 24, rotatable by means of a lever 55 and limited in its stroke by an arm 56 and adjustment screw 57 thereon, adapted to contact with one of the stops 25. The shaft 54 is illustrated as symmetrical, adapted for attaching, at either end thereof, the arm 56 and lever 55. The angular location of the latter, relatively to the pinion 53 is made adjustable by clutch members 58, or pluralities of teeth, on the contact faces of the lever 55 and arm 56, locating the lever, as desired and binding it by nuts 59 to the arm, with the teeth engaged. A cover 60 is bolted on the shell 10, over the guide slot 21 and the needle 29.

The operation of the carbureter is as follows:—Fuel is supplied through the pipe 16 and is admitted to, and its stand is regulated in the reservoir 12, by the float 18 and valve 17, connected therewith. It passes by means of the passage 26 to, and stands in nozzle 28, nearly up to its outlet. Air is drawn in through the Venturi inlet 19 and it aspirates fuel out of the nozzle 28, and forms with it an explosive mixture.

When the engine is running under normal conditions, with its rated load, the lever 55, throttle 47 and needle 29, are located in the positions, shown in full lines in Fig. 4, and the fuel supply through the nozzle 28 is practically free. The Venturi throat 20 is not obstructed by the throttle 47, and the aspiration of the engine draws in a maximum supply of fuel and, through the Venturi tube, as much air as it can admit. Supplemental air is drawn in, at the same time, through the openings 39, valve 41, the space 35, around the tube 34, and the foraminous wall 31, of the Venturi delivery part 30. The arrangement of the port 48, in relation to the throat 20, and the admission of supplemental air through the foraminous wall 31, cause the explosive mixture to be as lean as it is practicable to fire a hot engine.

When the engine is first being started, the lever 55, throttle 47 and needle 29 are moved approximately into mean position, as shown in Fig. 6. The supplemental air inlets 39 are covered by the throttle 47 and the circular opening of the port 48, partly throttles the Venturi throat 20. No air can be drawn through the supplemental air inlets 39 and valve 41, and the entire air supply is drawn through the Venturi tube and forced, by the position of the throttle 47, to flow in a contracted current of high velocity across the outlet of the fuel nozzle 28, sucks therefrom a relatively large amount of fuel and forms therewith a rich mixture, well adapted to be fired in a cold engine.

When the engine is running idly, the lever 55 is located at the opposite limit of the stroke, the throttle 47 is fully advanced and covers the supplemental air inlets 39, as indicated in dotted lines in Fig. 4. The port 48 is out of register with the Venturi throat 20, and the tip of the contracted extension of the port 48, is located slightly above the outlet of the fuel nozzle 28 which, in this position of the needle 29, is reduced to its minimum discharge area. Under such circumstances, no air whatever can be drawn in through the supplemental air inlets 39, and only the minimum quantity, through the unobstructed portion of the contracted extension of the port 48. Part of this air is drawn directly across the outlet of the fuel nozzle 28, sucks the minimum quantity of fuel therefrom and forms therewith an explosive mixture, just sufficient to turn the engine idly.

When the engine is stopped, the parts are located nearly as above described, but slightly more advanced, so that the needle 29 will entirely close the nozzle 28 and prevent any loss of fuel on this occasion. When the engine is running under light and varying loads, the operator can economize fuel and secure its perfect combustion, by varying the position of the lever 55, proportionally to the necessity for power.

A Venturi tube in a fluid conduit causes the mean velocity of fluid, flowing through its throat, to become several times the mean velocity in the conduit. This velocity equals and even exceeds, in fact, the maximum velocity therethrough, considerably exceeds, the theoretical velocity of discharge of fluid from a reservoir, due to a pressure, equal to the loss of head. By locating the outlet of the fuel nozzle 28, substantially in the area of maximum velocity of the Venturi throat, the maximum suction of fuel is obtained, possible with a given engine suction.

Air, coming at high velocity from the Venturi throat, flows through and fills the expanding Venturi delivery part 30. Its velocity is reduced thereby inversely proportional to the cross sectional area of the latter. It correspondingly expends its momentum in dilation, causes suction on its foraminous wall 31 and, without waste of power, draws through it, the supplemental air, when the throttle 47 is open. The same power, engine suction and kinetic energy of the incoming air, necessary to suck in the fuel, subsequently sucks in the supplemental air. This carbureter, therefore, effects a considerable increase in power and efficiency of engines, to which it is applied. It does this by supplying perfect explosive mixtures, at varying engine speeds, and by making it possible to vary the active area of the supply ports and conduits and thereby control the back pressure and negative work of the engine.

As illustrated in dotted lines in Fig. 4, when the engine is running idly, all the air supply ports are closed, save that the extension of the throat port 48 is so located that the sole air supply is drawn through its upper portion and directly across the outlet of the fuel nozzle 28. Thus concentrating the air supply, gives it high enough velocity to suck in sufficient fuel for a reliable explosive mixture. At the same time, the volume of the latter is so small that it will develop only power enough, to turn the engine idly, at low speed.

Claims.

1. In a carbureter for explosion engines, a shell containing a fuel reservoir connected with a fuel supply and a fuel nozzle and containing a float adapted to regulate the supply of fuel, a tubular wall of said shell forming a tubular passage and formed with guides and openings as hereinafter referred to; an inner tube smaller than, located in, and closing the end of said passage, and formed with openings as hereinafter referred to, a Venturi tube bent substantially through a right angle, having its throat substantially coinciding with an opening formed therefor in said inner tube, its inlet cone connected with an opening in said tubular wall, the fuel nozzle opening into its throat and its delivery port located in said inner tube and formed with a foraminous wall; a diaphragm in said inner tube exterior to said venturi and containing a supplemental air port; a spring seated valve co-acting with said air port; a cap closing the end of said tube exterior to said diaphragm and valve; said tubular wall and inner tube being formed with supplemental air inlets between said diaphragm and cap; a tubular throttle valve mounted on said inner tube, adapted to cover and uncover said inlets and formed with a circular port adapted to register with the Venturi throat opening in said inner tube and having a graduated tapered extension, a guide head formed on said throttle adapted to co-act with the guides of the tubular wall, a needle valve connected with said throttle adapted to throttle the outlet of the fuel nozzle, and means to reciprocate said tubular throttle valve.

2. In a carbureter for explosive engines, a shell containing a fuel reservoir connected with a fuel supply and a fuel nozzle and containing a float adapted to regulate the supply of fuel; a tubular wall of said shell forming a tubular passage and formed with guides and an opening as hereinafter referred to; an inner tube smaller than, located in, and closing one end of said passage and formed with an opening as hereinafter referred to; a Venturi tube bent substantially through a right angle, having its throat substantially coinciding with an opening formed therefor in said inner tube, its inlet cone connected with an opening in said tubular wall, the fuel nozzle opening into its throat and its delivery port located in said inner tube; a tubular throttle valve mounted on said inner tube, formed with a circular port adapted to register with the Venturi throat opening in said inner tube and having a graduated, tapered extension, a guide head formed on said throttle adapted to co-act with guides of said tubular wall, a needle valve connected with said throttle adapted to throttle the outlet of the fuel nozzle, and means to reciprocate said tubular throttle valve.

3. In a carbureter for explosion engines comprising a shell containing a fuel reservoir connected with a fuel supply and a fuel nozzle and containing a float adapted to regulate the supply of fuel, the combination therewith of a tubular wall of such shell forming a tubular passage and formed with a slot whose edges form guides, an axially extending recess and openings as hereinafter referred to; an inner tube, smaller than, located in and closing one end of such passage and formed with an opening hereinafter referred to; a Venturi tube bent substantially through a right angle, having its throat substantially coinciding with an opening formed therefor in said inner tube, its inlet cone connected with an opening in said tubular wall and the fuel nozzle extending into it and its delivery port located in said inner tube, a throttle valve mounted on said inner tube, engaging said guides and adapted to regulate the passage of air through said Venturi tube, and operating means operably connected with said throttle valve.

4. In a carbureter for explosive engines, comprising a shell containing a fuel reservoir connected with a fuel supply and a fuel nozzle and containing a float adapted to regulate the supply of fuel, the combination therewith of a tubular wall of such shell forming a tubular passage and formed with a slot whose edges form guides, an axially extending recess and openings as hereinafter referred to; an inner tube, smaller than, located in and closing one end of such passage and formed with an opening hereinafter referred to; a Venturi tube bent substantially through a right angle, having its throat substantially coinciding with an opening formed therefor in said inner tube, its inlet cone connected with an opening in said tubular wall and the fuel nozzle extending into and its delivery part located in said inner tube, a tubular throttle valve mounted on said inner tube, formed with a circular port adapted to register with the Venturi throat and a graduated extension of said port, on said throttle a head engaging said guides, and a rack, a pinion engaging said rack, extending through an opening in said tubular wall and fixed on a shaft revolubly mounted in said wall, and fixed to said shaft a lever, and a graduating screw adapted to engage a fixed stop and limit the stroke of said throttle.

5. In a carbureter for explosive engines, comprising a shell containing a fuel reservoir connected with a fuel supply and a fuel nozzle and containing a float adapted to regulate the supply of fuel, the combination therewith of a tubular wall of such shell forming a tubular passage and formed with a slot whose edges form guides, an axially extending recess and openings as hereinafter referred to; an inner tube, smaller than, located in and closing one end of such passage and formed with an opening hereinafter referred to; a Venturi tube bent substantially through a right angle having its throat substantially coinciding with an opening formed therefor in said inner tube, its inlet cone connected with an opening in said tubular wall and the fuel nozzle extending into it and its delivery port located in said inner tube, a tubular throttle valve mounted on said inner tube, formed with a circular port adapted to register with the Venturi throat and a graduated extension of said port; on said throttle valve a head engaging said guides, and a rack, a pinion engaging said rack, extending through an opening in said tubular wall and fixed on a shaft revolubly mounted in said wall; an arm fixed to said shaft, a graduating screw in said arm adapted to engage a fixed stop and limit the stroke of said throttle, a lever on said shaft and clutch formations on said arm and lever adapted to engage them in adjusted angular relations.

6. In a carbureter for explosive engines, comprising a shell containing a fuel reservoir connected with a fuel supply and a fuel nozzle and containing a float adapted to regulate the supply of fuel, the combination therewith of a tubular wall of such shell forming a tubular passage with an axially extending recess and a slot therein, adjacent thereto a shaft support and a stop, a tubular valve operable in said passage and having a member playing in said recess, valve shifting means mounted in said shaft support and coacting with said valve and stroke-adjustment means on said shifting means and adjustable relatively to said stop.

7. In a carbureter comprising a shell containing a fuel reservoir connected with a fuel supply and a fuel nozzle and containing a float adapted to regulate the supply of fuel, the combination therewith of a bent Venturi tube whose delivery port has a foraminous wall and having the fuel nozzle opening substantially into its throat.

8. In a carbureter adapted to be connected with a chamber in which pressure less than atmosphere periodically obtains and comprising a fuel reservoir connected with a fuel supply, a fuel nozzle and a float adapted to regulate the supply of fuel, the combination therewith of suction intensifying apparatus comprising a Venturi tube communicating with the atmosphere by its inlet cone and by its delivery cone with said chamber, having the fuel nozzle opening into its throat, and, adjacent to its throat, a foraminous section in the wall of its delivery cone.

9. In a carbureter adapted to be connected with a chamber in which pressure less than atmosphere periodically obtains and comprising a fuel reservoir connected with a fuel supply, a fuel nozzle and a float adapted to regulate the supply of fuel, the combination therewith of suction intensifying apparatus comprising an air supply conduit communicating with said chamber; a Venturi tube located in and having the wall of its delivery cone joined to the wall of said conduit, its inlet cone communicating independently with the atmosphere, the fuel supply nozzle opening into its throat, and, adjacent to its throat, a foraminous section in the wall of its delivery cone; and a valve controlling the admission of air to said conduit exterior to said Venturi tube.

10. In a carbureter adapted to be connected with a chamber in which pressure less than atmosphere periodically obtains and comprising a fuel reservoir connected with a fuel supply, a fuel nozzle and a float adapted to regulate the supply of fuel, the combination therewith of suction intensifying apparatus comprising an air supply conduit communicating with said chamber; a Venturi tube located in and having the wall of its delivery cone joined to the wall of said conduit, its inlet cone communicating independently with the atmosphere, the fuel supply nozzle opening into its throat, and adjacent to its throat, a foraminous section in the wall of its delivery cone; a valve controlling the admission of air to said conduit exterior to said Venturi tube; and a check valve between the aforesaid valve and said Venturi tube.

11. In a carbureter adapted to be connected with a chamber in which pressure less than atmosphere periodically obtains and comprising a fuel reservoir connected with a fuel supply, a fuel nozzle and a float adapted to regulate the supply of fuel, the combination therewith of suction intensifying apparatus comprising an air supply conduit communicating with said chamber; a Venturi tube located in and having the wall of its delivery cone joined to the wall of said conduit, its inlet cone communicating independently with the atmosphere, the fuel supply nozzle opening into its throat, and, adjacent to its throat, a foraminous section in the wall of its delivery cone; a valve controlling the admission of air to said conduit exterior to said Venturi tube; and a graduating valve controlling the throat of said Venturi tube.

12. A carbureter for explosion engines comprising a shell containing a fuel reservoir connected with a fuel supply and containing a float adapted to regulate the supply of fuel, a Venturi tube, a fuel nozzle connected with said fuel reservoir and opening into said Venturi's throat, a valve operable to regulate the volume of air flowing through said Venturi throat and having a port substantially coinciding with the opening of said throat when in register therewith, said port having a narrow extension adapted, when the valve is shifted, to direct the supply of air flowing through said Venturi throat directly by the outlet of said fuel nozzle, a needle valve connected with said first named valve and coacting with the outlet of said fuel nozzle.

13. In a carbureter for explosion engines comprising a tubular shell having a fuel nozzle connected with a fuel supply, an inner tube in said shell closing one end of said tubular shell, there being an opening in said tubular shell and there being an opening in said inner tube registering with one another, a Venturi tube having its throat substantially coinciding with the opening formed in said inner tube, the fuel nozzle extending across the outside of the throat of said Venturi tube, a throttle valve mounted on said inner tube to regulate the passage of air through said Venturi tube, and operating means for said throttle valve.

14. In a carbureter for explosion engines comprising a tubular shell having a fuel nozzle connected with a fuel supply, an inner tube in said tubular shell closing one end of said tubular shell, there being an opening in said tubular shell and there being an opening in said inner tube registering with one another, a Venturi tube having its throat substantially coinciding with the opening formed in said inner tube and its delivery end disposed in said inner tube, the fuel nozzle extending across the outside of the throat of said Venturi tube, a tubular throttle valve slidably mounted between said inner tube and said shell, a needle on said valve registering with said fuel nozzle, and means for operating said tubular valve to regulate the passage of air into said Venturi tube and the passage of fuel through said fuel nozzle.

15. In a carbureter for explosion engines comprising a tubular shell having a fuel nozzle connected with a fuel supply, an inner tube in said tubular shell closing one end of said tubular shell, there being an opening in said tubular shell and there being an opening in said inner tube registering with one another, a Venturi tube having its throat substantially coinciding with the opening formed in said inner tube and its delivery end disposed in said inner tube, the fuel nozzle extending across the outside of the throat of said Venturi tube, a tubular throttle valve slidably mounted between said inner tube and said shell, a needle on said valve registering with said fuel nozzle, and means for operating said tubular valve to regulate the passage of air into said Venturi tube and the passage of fuel through said fuel nozzle, said operating means comprising a rack on said tubular valve, a pinion engaging said rack, and means actuating said pinion to actuate said tubular valve.

16. In a carbureter for explosion engines the combination of a Venturi tube, a fuel nozzle extending transversely into the throat of the Venturi tube, a fuel valve for said nozzle and a valve controlling said Venturi tube and consisting of a thin piece of material having an opening through it substantially as specified.

17. In a carbureter for explosion engines the combination of a Venturi tube, a fuel nozzle extending transversely into the throat of the Venturi tube, a fuel valve for said nozzle and a valve controlling said Venturi tube and consisting of a thin piece of material having an opening through it and arranged close to said nozzle, substantially as specified.

18. In a carbureter for explosion engines the combination of a Venturi tube, a fuel nozzle extending transversely into the throat of the Venturi tube, a fuel valve for said nozzle and a valve controlling said Venturi tube and consisting of a thin piece of material having an opening through it and arranged between said nozzle and the outlet of the Venturi tube, substantially as specified.

Signed at New York, in the county and State of New York, this 1st day of March, 1918.

ERNEST F. CIGLIA.
LOUIS F. PELLETIER.

In presence of—
R. JULIAN SACHERS.